United States Patent Office 3,634,509

Patented Jan. 11, 1972

1

2

3,634,509

2,6-DINITROANILINOACETAMIDES

John Yates, Whitstable, Kent, and Barry R. J. Devlin, Sittingbourne, Kent, England, assignors to Shell Oil Company, New York, N.Y.

No Drawing. Continuation-in-part of application Ser. No. 642,341, May 31, 1967. This application Sept. 3, 1969, Ser. No. 855,014

Claims priority, application England, Sept. 4, 1968, 42,055/68; June 8, 1966, 25,473/66

Int. Cl. C07c *103/22*

U.S. Cl. 260—558 8 Claims

ABSTRACT OF THE DISCLOSURE

Novel herbicidal ortho-nitroanilinoacetamides such as 2-(2,6-dinitroanilino)-N-methyl-propionamide.

This application is a continuation-in-part of application Ser. No. 642,341, filed May 31, 1967, now abandoned.

FIELD OF THE INVENTION

This invention relates to novel ortho-nitroaninoacetamides having 2–3 nitro groups in the benzene moiety of the anilino radical, methods of killing unwanted plants with said ortho-nitroanilinocetamides, and herbicidal compositions containing said ortho-nitroanilinoacetamides and an inert carrier.

DESCRIPTION OF THE PRIOR ART

Meta-nitroanilino-N,N-diethyl acetamide has been disclosed in U.S. 2,568,142. The compound is alleged to have pharmacological activity, i.e., possibly useful as an anesthetic, analgesic, soporific, etc.

SUMMARY OF THE INVENTION

Surprisingly, we have now found that novel ortho-nitroanilinoacetamides having at least two substituents in the benzene moiety of the anilino radical have potent herbicidal properties. The novel ortho-nitroanilinoacetamides are described by the following formula (I)

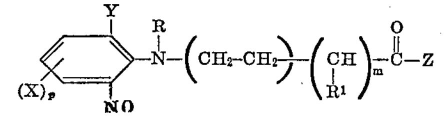

wherein

X is alkyl of 1–4 carbon atoms, haloalkyl of 1–4 carbon atoms, alkylsulfonyl of 1–4 carbon atoms, halogen, cyano, or

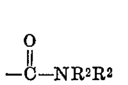

in which each $R^2$ is hydrogen or alkyl of 1–4 carbon atoms, *p* is 0 or 1;

Y is hydrogen or nitro;

R is hydrogen or alkyl of 1–4 carbon atoms;

$R^1$ is alkyl of 1–4 carbon atoms;

Z is morpholino, piperidino, or —$NR^3R^4$ in which $R^3$ is hydrogen, alkyl of 1–4 carbon atoms, phenol, monohydroxyalkyl of 1–4 carbon atoms, hydroxy, methoxy, or alkenyl of 2–6 carbon atoms and $R^4$ is hydrogen or alkyl or alkyl of 1–4 carbon atoms;

*n* is 0 or 1, *m* is 0 or 1 and $m+n=1$; with the proviso that at least one of X and Y is nitro.

An examination of the compounds of Formula I will indicate that the compounds can have an asymmetric carbon atom when *n* is 0 and *m* is 1 leading to optical isomers. These optical isomers, both the *d* and *l* forms, as well as mixtures of the two, are understood to be within the scope of this invention (*d* and *l* being used herein to denote absolute configuration and being synonymous with D and L respectively).

Considering the alkylene radical that connects the anilino and carbamoyl groups of the compounds of Formula I the compounds can have either the structure (II)

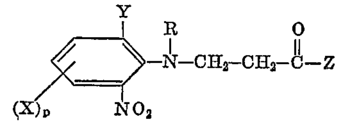

when *n* is 1, or (III)

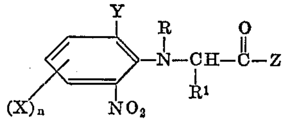

when *m* is 1.

Referring to the substituent alkyl or alkenyl moieties represented by X, R, $R^1$ and Z, it is understood that they may be either straight or branched chain alkyl or alkenyl. This includes all the groups containing these moieties, i.e. alkyl, haloalkyl, alkylsulfonyl, etc.

The compounds are also characterized by having 2–3 nitro substituents in the anilino moiety. Thus, when Y is nitro, X may be nitro or any of the other radicals represented by X. When, however, Y is hydrogen, X must be nitro. Conversely, when X is other than nitro, Y must be nitro.

It is also evident from Formula I that the X substituent can occupy the 3-, 4- or 5-position of the benzene moiety. When Y is hydrogen, this leads to representative compounds such as 2-(2,3-dinitroanilino)-N-methylpropionamide, 3-(2,3-dinitroanilino)-N-methylpropionamide, 2-(2,4-dinitroanilino)-N-methylpropionamide, 3-(2,4-dinitroanilino)-N-methylpropionamide, 2-(2,5-dinitroanilino)-N-methylpropionamide, 3-(2,5-dinitroanilino)-N-methylpropionamide and the like.

The variety of compounds is greater when Y is nitro. Thus, when Y is nitro and X is alkyl of 1–4 carbon atoms, the anilino moiety is always substituted at the 2,6-position with nitrogen while the alkyl radical is in the 3-, 4- or 5-position. Illustrative compounds include 2-(2,6-dinitro-3-methylanilino)-N-methylpropionamide, 2-(2,6-dinitro-4-methylanilino)-N-methylpropionamide, 2-(2,6-dinitro-5-(methylanilino)-N-methylpropionamide and the like as well as the corresponding 3-anilinopropionamides when *n* is 1.

Likewise, when Y is nitro aind X is haloalkyl of 1–4 carbon atoms, the haloalkyl may be in the 3-, 4- or 5-position in the anilino moiety. Compounds within the subgenus include 2-(2,6-dinitro-3-trifluoromethylanilino)-N-methylpropionamide, 2-(2,6-dinitro-4-trifluoromethylanilino)-N-methylpropionamide and the like as well as the corresponding 3-anilinopropionamides when *n* is 1.

When Y is nitro and X represents the remaining members of the group, the following are illustrative of the compounds of the invention:

X is alkylsulfonyl: 2-(2,6-dinitro-3-methylsulfonylanilino)-N-methylpropionamide, 2-(2,6-dinitro-4-methylsulfonylanilino)-N-methylpropionamide, 2 - (2,6-dinitro-5-methylsulfonylanilino)-N-methylpropionamide;

X is nitro: 2-(2,3,6-trinitroanilino)-N-methylpropionamide, 2-(2,4,6-trinitroanilino)-N-methylpropionamide;

X is halogen: 2-(2,6-dinitro-3-chloroanilino)-N-methylpropionamide, 2-(2,6-dinitro-4-chloroanilino)-N-methylpropionamide, 2-(2,6-dinitro-5-chloroanilino)-N-methylpropionamide;

X is cyano: 2-(2,6-dinitro-3-cyanoanilino)-N-methylpropionamide, 2-(2,6-dinitro-4-cyanoanilino)-N-methylpropionamide, 2-(2,6-dinitro-5-cyanoanilino)-N-methylpropionamide;

$$X \text{ is } -\overset{\overset{O}{\|}}{C}-NR^2R^2;$$

2-(2,6-dinitro-3-N-methylcarbamoylanilino) - N - methylpropionamide, 2 - (2,6 - dinitro - 4 - N - methylcarbamoylanilino)-N-methylpropionamide, 2-(2,6-nitro-5-N-methylcarbamoylanilino)-N-methylpropionamide; and when

*p* is O: 2-(2,6-dinitroanilino)-N-methylpropionamide. It is understood, of course, that all of the 3-anilinopropionamide (*n* is 1) isomers of the above compounds are equally representative of the invention compounds.

While the above compounds of the invention illustrating the anilino substituents have been limited to only one species of the substituent generic group, i.e., methyl, trifluoromethyl, methylsulfonyl, chloro and N-methylcarbamoyl, and only the 2- or 3-anilino substituted N-methylpropionamide, the other members of the respective generic groups are equally representative. Thus, the alkyl radicals of X, R and $R^1$ may include methyl, ethyl, n-propyl, isopropyl, n-butyl, tert-butyl and the like. Suitable haloalkyls include the monohaloalkyls such as fluoromethyl, chloromethyl, 2-chloroethyl, 3-bromobutyl and the polyhaloalkyls such as dichloromethyl, tribromomethyl, 2,2-dichloroethyl, 3,3,3 - trifluoro - n - propyl, 1,2,3-tribromo-n-propyl, 1,2,3,4-tetrachloro-n-butyl, 3,3,4,4-tetrachloro-n-butyl and the like. The alkylsulfonyl radicals include ethylsulfonyl n-propylsulfonyl, isopropylsulfonyl, n-butylsulfonyl, sec-butylsulfonyl and the like. Other halogens besides chlorine are fluorine, bromine and iodine while the radical $$-\overset{\overset{O}{\|}}{C}-NR^3R^3$$

includes such groups as carbamoyl, N,N-diethylcarbamoyl, N-butylcarbamoyl, N-methyl-N-ethylcarbamoyl and the like. When Z is $-NR^3R^4$, suitable alkyls include methyl, ethyl, n-propyl, isopropyl, n-butyl, isobutyl and the like; monohydroxyalkyls include the 1- and 2-hydroxyethyls, 2-hydroxy-n-propyl, 3-hydroxy-n-propyl, 2-hydroxy-isopropyl, 4-hydroxy-n-butyl and the like; and representative alkenyls include vinyl, 1-propenyl, 2-propenyl, 1-methyl-2-propenyl, 1-butenyl, 3-butenyl, 2-methyl-3-butenyl, 2-pentenyl, 4-pentenyl, 3-methyl-1-butenyl, 3-hexenyl, 5-hexenyl, 3-methyl-5-pentenyl and the like.

The ortho-nitroanilinoacetamides of the invention are useful as herbicides, i.e., for killing or inhibiting the growth of unwanted plants. They are particularly effective as pre-emergent herbicides as will be evident from the illustrative herbicidal experimental data of the examples.

The ortho-nitroanilinoacetamides may also be used in the form of herbicidal compositions. These herbicidal compositions contain the conventional inert carriers, i.e., the liquid or solid agents normally associated with herbicides.

Suitable solid carriers are clays, silicates, synthetic hydrated silicon dioxides, resins, waxes, synthetic polymeric materials, carbon, sulfur and the like. Liquid carriers include water, alcohols, ketones, aromatic hydrocarbons, aliphatic hydrocarbons, chlorinated aliphatic and aromatic hydrocarbons and petroleum fractions such as kerosene.

In addition to the carrier the herbicidal composition may contain a surface active agent which may be anionic, cationic or non-ionic. Examples of suitable surface-active agents include alkylaryl sulphonates, alkyl sulphates containing more than 10 carbon atoms, alkylphenol/ethylene oxide condensates, sorbitan esters of fatty acids, alkylamide sulphonates, ethylene oxide/fatty acid ester condensates and the like.

The herbicidal composition containing the inert carrier and/or surface active agent may be formulated as a wettable powder, a dust, granules, a concentrate, a solution, an emulsifiable concentrate, etc.

The amount of the ortho-nitroanilinoacetamide necessary to kill or inhibit the growth of the plants is defined as the herbicidal amount. This quantity will obviously vary with the species of ortho-nitroanilinoacetamide, the plant species, type of formulation, environmental conditions and the like. Under a particular set of conditions, however, it is readily determined, e.g., by the use of controls.

The herbicidal composition will usually contain from about 0.001–95% by weight of the active ingredient, i.e., the ortho-nitroanilinoacetamide, based on the total weight of active ingredients and carrier.

The ortho-nitroanilinoacetamides of the invention may be prepared by reacting the appropriate ortho-nitrohalobenzene with a suitable aliphatic amino acid to form an ortho-nitroanilinoaliphatic monocarboxylic acid, converting the acid to the acid chloride and forming the amide by reacting the acid chloride with the appropriate amine.

The ortho-nitrohalobenzenes are represented by the formula (IV)

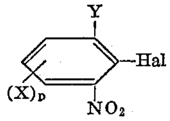

wherein Hal is halogen, i.e., fluorine, chlorine, bromine, or iodine and X and Y are as previously described. Illustrative of these compounds are: 2,3-dinitro-1-chlorobenzene, 2,4-dinitro-1-chlorobenzene, 2,5-dinitro-1-chlorobenzene, 2,6 - dinitro-3-methyl - 1 - chlorobenzene, 2,6-dinitro-5-trifluoromethyl - 1 - chlorobenzene, 2,6 - dinitro-4-methylsulfonyl-1-chlorobenzene, 2,4,6 - trinitro-1-chlorobenzene, 2,6-dinitro - 1,3 - dichlorobenzene, 2,6-dinitro-4-cyano-1-chlorobenzene, 2,6-dinitro-4-carbamoyl-1-chlorobenzene and the like.

The aliphatic amino acids are those represented by the formula $$\text{(VI)} \qquad H-\overset{\overset{R}{|}}{N}-(CH_2-CH_2)_n-(\overset{\overset{R_1}{|}}{C}H)_m-\overset{\overset{O}{\|}}{C}-OH$$

wherein R, $R^1$, *n* and *m* are as previously defined. Suitable aliphatic amino acids include 3-(N-ethylamino)-propionic acid, 3-aminopropionic acid, 2-aminopropionic acid, 2-(N-methylamino)-butyric acid, 2-aminovaleric acid, 2-aminocaproic acid and the like. The *d*, *l*, and *d–l* forms of these acids are also included.

The amines used to convert the acid chlorides to the amides have the formula $$\text{(IV)} \qquad H-NR^3R^4$$

wherein $R^3$ and $R^4$ are as previously defined. In addition to the amines of Formula VI, morpholine and piperidine are also suitable. Suitable amines include ammonia, methylamine, ethylamine, n-propylamine, isopropylamine, n-butylamine, methyethylamine, diethylamine, methylbutylamine, methylphenylamine, ethylphenylamine, phenylamine, hydroxymethylamine, 3-hydroxypropylamine, 4-hydroxybutylmethylamine, 2-propenylamine, 2-propenylmethylamine, 3-butenylamine, 2-butenylamine, 4-hexenylamine, hydroxylamine, N-methyl hydroxamine and methoxyamine hydrochloride.

The reaction between the ortho-nitrohalobenzene and the aliphatic amino acid is carried out in the liquid phase at a temperature of about 50–150° C., preferably between 70–120° C. A suitable inert solvent is generally used as a reaction medium. These inert solvents include alcohols such as methyl alcohol, ethyl alcohol, propyl alcohol, isopropyl alcohol, butyl alcohol and the like; mixtures of water and the above alcohols; aromatic hydrocarbons such as benzene, toluene, the xylenes; aliphatic hydrocarbons such as pentane, hexane, cyclohexane and the like; ethers such as ethyl ether, propyl ether, methylethyl ether and the like. Superatmospheric pressures may be desirable at times to keep the reaction mixture in the liquid phase.

The reaction between the ortho-nitrohalobenzene and the aliphatic amino acid is preferably carried out in the presence of a proton acceptor to bind the acidic hydrogen halide formed during the reaction. Suitable proton acceptors include inorganic basic materials such as alkali metal bicarbonates, carbonates and hydroxides, e.g., sodium bicarbonate, sodium carbonate, sodium hydroxide. The alkaline earth metal carbonates and hydroxides, e.g., calcium carbonate, calcium hydroxide, may also be employed. Organic basic materials such as nitrogenous bases, e.g., pyridine, may also be used.

The molar ratio of the aliphatic amino acid to the ortho-nitrohalobenzene usually varies between 0.75/1 to about 1.25/1, with a 1/1 to about 1.1 ratio being preferred. In other words the stoichiometric amount or a slight stoichiometric excess of the aliphatic amino acid is preferred.

The reaction may be performed by merely mixing the aliphatic amino acid, ortho-nitrohalobenzene and proton acceptor in a suitable inert solvent and heating, preferably at the reflux temperature of the mixture. The ortho-nitroanilinoaliphatic monocarboxylic acid formed is separated by conventional techniques such as filtration of the mixture, washed and dried.

The ortho-nitroanilinoaliphatic carboxylic acid is converted to the acid chloride by conventional techniques. Thus, the acid may be reacted with the acid chlorides of inorganic acids in the liquid phase in a suitable inert organic solvent. Suitable acid chlorides of inorganic acids include the phosphorus halides such as phosphorus trichloride, phosphorous oxychloride and phosphorus pentachloride and the sulfur halides such as thionyl chloride. Suitable inert solvents include the aliphatic and aromatic hydrocarbons such as pentane, hexane, cyclohexane, benzene, toluene, the xylenes; chlorinated aliphatic and aromatic hydrocarbons such as carbontetrachloride, n-butyl chloride, chlorobenzene, ortho-chlorotoluene, and the like. The inert solvent should be anhydrous since the acid chloride produced is reactive with water.

The reaction is generally carried out at the reflux temperature of the particular solvent, usually at temperatures between about 25–150° C.

The inorganic acid chloride, e.g., thionyl chloride, is added to the carboxylic acid in at least the stoichiometric amount needed for conversion to the acid chloride, usually in excess of this amount. Molar ratios of about 1/1 to 10/1 are generally adequate, 2/1 to 5/1 being preferred.

The acid chloride is readily prepared by dissolving the carboxylic acid in a suitable solvent and slowly adding the inorganic acid chloride. The mixture is then held at the reflux temperature to insure complete reaction. Thionyl chloride is preferably used since at the completion of the reaction, the solvent and excess thionyl chloride can be distilled off, leaving the carboxylic acid chloride.

The reaction between the carboxylic acid chloride and the amine is carried out in the liquid phase, preferably in the presence of an inert solvent at temperatures of about −20 to 100° C., preferably at about −20 to 30° C. Suitable solvents include aliphatic and aromatic hydrocarbons such as pentane, hexane, cyclohexane, benzene, toluene, the xylenes; chlorinated aliphatic and aromatic hydrocarbons such as methylene chloride, chloroform, carbon tetrachloride, ethylene chloride, ethylidene chloride, chlorobenzene, o-dichlorobenzene, o-chlorotoluene; ethers such as ethyl ester n-propyl ether, isopropyl ether, n-butyl ether, and the like.

The ortho-nitroanilinoacetamide is readily formed by dissolving the carboxylic acid chloride in the solvent and adding the amine, preferably dissolved in the same solvent, to this solution. After filtration of any precipitate formed, the ortho-nitroanilinoacetamide may be obtained by evaporating the solution to dryness.

Another method of preparing the ortho-nitroanilinoacetamides of the invention involves the liquid phase reaction of an ortho-nitrohalobenzene of Formula IV with an appropriate aminoacetamide

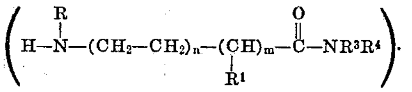

The same reaction conditions, i.e., solvents, proton acceptors, temperatures, etc., are applicable as employed in the reaction between the orthonitrohalobenzene and the aliphatic amino acid previously described. The aminoacetamides may be prepared by methods known in the art, e.g., F. Bergel et al., Jour. Chem. Soc. (London) 1964, 3965–72.

DESCRIPTION OF THE PREFERRED EMBODIMENTS

Because of their generally high herbicidal activity, orthonitroanilinoacetamides of the following formula are especially preferred:

(VII) 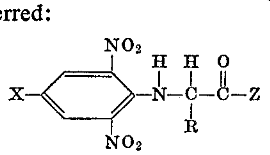

wherein

X is hydrogen, alkyl of 1–4 carbon atoms, halogen or halomethyl;

R is alkyl of 1–4 carbon atoms;

Z is morpholino or —$NR^1R^2$ in which $R^1$ is hydrogen, alkyl of 1–4 carbon atoms, allyl, hydroxymethyl, hydroxy or methoxy and $R^2$ is hydrogen or alkyl of 1–4 carbon atoms.

Exemplary components of Formula VII include:

When X is hydrogen: 4 - [-(2,6-dinitroanilino)-n-caproyl]-morpholine, 2-(2,6-dinitroanilino) - N,N-diethylvaleramide, 2-(2,6 - dinitroanilino-N-methyl-N-allylbutyramide, 2-(2,6-dinitroanilino) - N - hydroxymethylpropionamide and the like;

When X is alkyl of 1–4 carbon atoms: 4-[2-(2,6-dinitro - 4 - n - propylanilino)propionyl]-morpholine, 2-(2,6-dinitro-4-ethylanilino) - N - methylbutyramide, 2-(2,6-dinitro-4-methylanilino) - N - methylpropionamide and 2-(2,6 - dinitro-4-methylanilino)-N-methyl propionohydroxamic acid;

When X is halogen: 4-[2-(2,6-dinitro - 4 - iodoanilino) propionyl]-morpholine, 2-(2,6-dinitro - 4 - fluoroanilino)-N-methylpropionamide, 2 - (2,6-dinitro-4-bromoanilino)-N-methylpropionamide and the like;

When X is halomethyl: 4-[2-(2,6-dinitro - 4 - dichloromethyl)propionyl]-morpholine, 2-(2,6-dinitro - 4 - bromoethylanilino) - N - methylpropionamide, 2 - (2,6-dinitro-4-triiodomethylanilino) - N - methylpropionamide, 2-(2,6-dinitro - 4 - trichloromethylanilino) - N - methylpropionamide and the like.

The compounds of Formula VII having the highest herbicidal activity, and most preferred, are those in which Z is $NR^1R^2$ with $R^1$ being methyl or hydromethyl, preferably methyl, and $R^2$ being hydrogen; R is methyl; and X is methyl or ethyl, trihalomethyl, preferably trifluoromethyl, halogen, particularly middle halogen, i.e., chlorine or bromine, with chlorine preferred, or hydrogen.

Examples of this most preferred subclass are: 2 - (2,6-dinitroanilino) - N - methylpropionamide, 2 - (2,6 - dinitro - 4 - methylanilino) - N - methylpropionamide, 2 - (2,6 - dinitro - 4 - trifluoromethylanilino) - N - methylpropionamide, 2 - (2,6 - dinitro - 4 - chloroanilino) - N-methylpropionamide, 2 - (2,6 - dinitroanilino) - N,N - dimethylpropionamide, 2 - (2,6 - dinitroanilino) - N - ethylpropionamide, 2 - (2,6 - dinitroanilino) - N - methyl-N - hydroxymethylpropionamide, 2 - (2,6 - dinitro - 4-ethylanilino)-N-methylpropionamide.

The novel compounds, processes for their preparation and their herbicidal activity are further illustrated in the examples which follow. In the examples, parts by weight (w.) and parts by volume (v.) bear the same relations as the kilogram to the liter.

Example 1.—Preparation of N-methyl-2-(2,6-dinitroanilino)-propionamide

A mixture of 1 - chloro - 2,6 - dinitrobenzene (810 w.), DL-alpha-alanine (384 w.), and sodium bicarbonate (840 w.) was stirred and refluxed in 95% ethanol (8000 v.) for 18 hours. The mixture was diluted with water (4000 v.), filtered, and the ethanol was distilled off under reduced pressure. More water (4000 v.) was added during the distillation in order to maintain the solids in solution. The aqueous solution was cooled by the addition of ice (2000 w.) and acidified with concentrated hydrochloric acid (Congo red) while stirring. The initially formed sticky precipitate crystallized on continued stirring to a dark-yellow solid which was filtered off, washed with water, and air dried. Yield of 2 - (2,6 - dinitroanilino) propionic acid 980 w. (95%), M.P. 137–138° C.

A solution of 2 - (2,6 - dinitroanilino)propionic acid (490 w.) in benzene (2500 v.) was stirred, and thionyl chloride (570 v.) was added at such a rate that a smooth evolution of gasses occurred. When the addition was complete, stirring was continued, and the mixture was refluxed for 12 hours. The reaction mixture was then filtered, and the benzene and excess thionyl chloride distilled off under reduced pressure. The acid chloride remained as a dark red oil.

This oil was dissolved in methylene chloride (2500 v.) and the solution cooled to 0° C. Methylamine (160 w.) was dissolved in methylene chloride (1000 v.), and the solution was added to the solution of the acid chloride with stirring at 0–5° C. The precipitate was filtered off, and washed with methylene chloride (500 v.). The filtrate was evaporated to dryness, and the residue was stirred with industrial methylated spirit (1000 v.). The product was filtered off, washed with industrial methylated spirit (three times with 200 v.), and air dried. The N-methyl - 2 - (2,6 - dinitroanilino)propionamide was obtained as a yellow powder, melting point 146–148° C. Total yield 310 w., 61%.

Analysis (percent by weight).—Found: C, 44.6; H, 4.5. Calculated for $C_{10}H_{12}N_4O_5$: C, 44.7; H, 4.5.

Example 2.—Preparation of N-methyl-2-(4-methyl-2,6-dinitroanilino)-propionamide

This compound was prepared by applying a similar method as that described in Example 1, but using 4-chloro-3,5-dinitrotoluene as starting material instead of 1-chloro-2,6-dinitrobenzene. The overall yield of the desired product was 67% based on the 4 - chloro - 3,5-dinitrotoluene. The melting point of the intermediate 2 - (4 - methyl - 2,6 - dinitroanilino)propionic acid was 158–161° C.; the melting point of the N-methyl-2-(4 - methyl - 2,6 - dinitroanilino)propionamide was 149–151° C.

Analysis (percent by weight).—Found: C, 47.0; H, 4.7. Calculated for $C_{11}H_{14}N_4O_5$: C, 46.8; H, 4.9.

Examples 3–53

The following compounds were prepared by the methods outlined under the Summary of the Invention. The symbols *d* and *l* are used to represent the absolute configuration of the molecules and are synonymous with the more usual symbols D and L respectively.

| Example | Compound | | Melting point, ° C. | Analysis (percent by weight) Found C | Found H | Calculated C | Calculated H |
|---|---|---|---|---|---|---|---|
| | 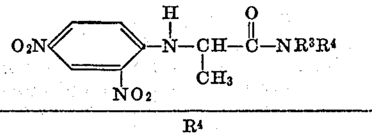 | | | | | | |
| | $R^3$ | $R^4$ | | | | | |
| 3 | H | $CH_3$ | 208–209 | 44.4 | 4.3 | 44.7 | 4.5 |
| 4 | $CH_3$ | $CH_3$ | 183–184 | 46.7 | 5.1 | 46.8 | 5.0 |
| | 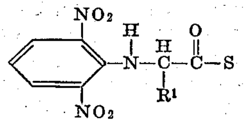 | | | | | | |
| | $R^1$ | Z | | | | | |
| 5 | $CH_3$ | $-NH_2$ | 220–222 | 42.5 | 3.9 | 42.4 | 3.9 |
| 6 | $CH_3$ | $-NHCH_3$(l) | 136–137 | 44.8 | 4.5 | 44.7 | 4.5 |
| 7 | $CH_3$ | $-NHCH_3$(d) | 136–137 | 44.6 | 4.5 | 44.7 | 4.5 |
| 8 | $CH_3$ | $-N(CH_3)_2$ | 81–83 | 46.7 | 4.7 | 46.8 | 5.0 |
| 9 | $CH_3$ | $-NH(C_2H_5)$ | 105–106 | 46.9 | 5.0 | 46.8 | 5.0 |
| 10 | $CH_3$ | $-N(C_2H_5)_2$ | 93–94 | 49.9 | 5.8 | 50.3 | 5.8 |
| 11 | $CH_3$ | $-NHCH(CH_3)CH_2CH_3$ | 113–114 | 50.6 | 5.8 | 50.3 | 5.8 |
| 12 | $CH_3$ | $-NCH_3$ 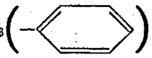 | 152–153 | 55.9 | 4.6 | 58.8 | 4.6 |
| 13 | $CH_3$ | $-NH$ 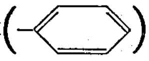 | 204–205 | 54.4 | 4.3 | 54.5 | 4.2 |
| 14 | $CH_3$ | $-NH(-CH-CH{=}CH_2)$ | 92–93 | 48.9 | 4.7 | 48.9 | 4.7 |
| 15 | $CH_3$ | $-N(CH_3)(CH_2OH)$ | 154–155 | 44.7 | 4.5 | 44.3 | 4.7 |
| 16 | $CH_3$ | 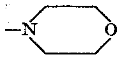 | 155–156 | 47.8 | 4.9 | 48.1 | 4.9 |
| 17 | $CH_3$ | 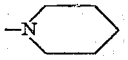 | 116–117 | 52.1 | 5.6 | 52.1 | 5.6 |
| 18 | $-CH(CH_3)_2$ | $-NHCH_3$ | 144–146 | 48.9 | 5.6 | 48.6 | 5.4 |
| 19 | $-CH_2CH(CH_3)_2$ | $-NHCH_3$ | 86–87 | 50.3 | 5.6 | 50.3 | 5.8 |

TABLE.—Continued

| Example | X | R | Z | Melting point, °C. | Analysis (percent by weight) Found C | Found H | Found | Calculated C | Calculated H | Calculated |
|---|---|---|---|---|---|---|---|---|---|---|
| 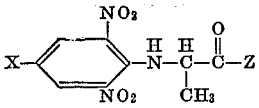 | | | | | | | | | | |
| | X | | Z | | | | | | | |
| 20 | $-CH_3$ | | $-NHCH_3$(l) | 132–134 | 47.0 | 5.3 | | 46.8 | 5.0 | |
| 21 | $-CH_3$ | | $-NHCH_3$(d) | 135–136 | 47.0 | 4.8 | | 46.8 | 5.0 | |
| 22 | $-C_2H_3$ | | $-NHCH_3$(d-l) | 120–121 | 48.6 | 5.3 | | 48.6 | 5.4 | |
| 23 | $-C_2H_5$ | | $-NHCH_3$(d) | 143–144 | | | 18.9(N) | 48.6 | 5.4 | 18.9(N) |
| 24 | $-C_2H_5$ | | $-NHCH_3$(l) | 142–143 | 48.8 | 5.2 | 18.9(N) | 48.6 | 5.4 | 18.9(N) |
| 25 | $-(CH_2)_2CH_3$ | | $-NHCH_3$ | 121–122 | 50.3 | 5.7 | 17.9(N) | 50.3 | 5.8 | 18.0(N) |
| 26 | $-CH(CH_3)_2$ | | $-NHCH_3$(d-l) | 138–139 | 51.7 | 6.2 | | 51.8 | 6.2 | |
| 27 | $-CH(CH_3)(CH_2CH_3)$ | | $-NHCH_3$ | | 51.7 | 6.2 | | 51.8 | 6.2 | |
| 28 | 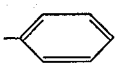 | | $-NHCH_3$ | 135–136 | 55.8 | 4.4 | | 55.8 | 4.6 | |
| 29 | $-CF_3$ | | $-NH_2$ | 174–176 | 37.3 | 2.9 | | 37.2 | 2.8 | |
| 30 | $-CF_3$ | | $-N(CH_3)_2$ | 80–82 | 41.2 | 3.6 | | 41.2 | 3.7 | |
| 31 | $-CF_3$ | | $-NHCH_3$(d-l) | 162–163 | 39.6 | 3.6 | | 39.3 | 3.3 | |
| 32 | $-CF_3$ | | $-NHCH_3$(d) | 189–190 | 39.6 | 3.5 | | 39.3 | 3.3 | |
| 33 | $-CF_3$ | | $-NHCH_3$(l) | 190–191 | 39.4 | 3.5 | | 39.3 | 3.3 | |
| 34 | $-SO_2CH_3$ | | $-NH_2$ | 278–280 | 36.5 | 3.6 | 10.0(S) | 36.2 | 3.6 | 9.7(S) |
| 35 | $-SO_2CH_3$ | | $-NHCH_3$ | *192–229 | 37.9 | 3.8 | 9.9(S) | 38.2 | 4.0 | 9.3(S) |
| 36 | $-SO_2CH_3$ | | $-N(CH_3)_2$ | 173–175 | 40.2 | 4.5 | 9.3(S) | 40.0 | 4.5 | 8.9(S) |
| 37 | Cl | | $-NHCH_3$(d-l) | 183–185 | 39.9 | 3.8 | 11.9(Cl) | 39.7 | 3.6 | 11.8(Cl) |
| 38 | Cl | | $-NHCH_3$(d) | 149–150 | 39.7 | 3.9 | 11.9(Cl) | 39.7 | 3.6 | 11.8(Cl) |
| 39 | Cl | | $-NHCH_3$(l) | 149–150 | 39.8 | 3.6 | 11.9(Cl) | 39.7 | 3.6 | 11.8(Cl) |
| 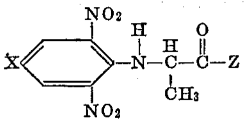 | | | | | | | | | | |
| | X | | Z | | | | | | | |
| 40 | $-CN$ | | $-NHCH_3$ | 155–156 | 45.3 | 3.7 | | 45.0 | 3.8 | |
| 41 | 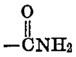 | | $-NHCH_3$ | 229–230 | 42.2 | 4.2 | | 42.4 | 4.2 | |
| 42 | 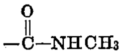 | | $-NHCH_3$ | 238–239 | 44.3 | 4.8 | | 44.3 | 4.6 | |
| 43 | $-NO_2$ | | $-NHCH_3$ | 172–173 | 38.7 | 3.6 | | 38.4 | 3.5 | |
| 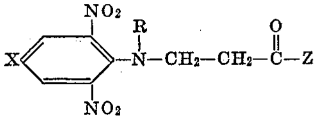 | | | | | | | | | | |
| | X | R | Z | | | | | | | |
| 44 | H | H | $-NHCH_3$ | 109–110 | 44.7 | 4.2 | | 44.7 | 4.5 | |
| 45 | H | H | $-N(CH_3)_2$ | 95–96 | 47.1 | 4.9 | | 46.8 | 5.0 | |
| 46 | H | $CH_3$ | $-NHCH_3$ | 104–105 | 47.1 | 4.8 | | 46.8 | 5.0 | |
| 47 | $-CH_3$ | H | $-NHCH_3$ | 106 | 47.1 | 5.0 | 19.5(N) | 46.8 | 5.0 | 19.8(N) |
| 48 | $-CF_3$ | H | $-N(CH_3)_2$ | 128–129 | 41.0 | 3.9 | 16.2(F) | 41.2 | 3.7 | 16.3(F) |
| 49 | $-CF_3$ | $CH_3$ | $-NHCH_3$ | 130–312 | 41.0 | 3.7 | | 41.2 | 3.7 | |
| 50 | $-CF_3$ | H | $-NHCH_3$ | 122–124 | 39.7 | 3.4 | 16.7(F) | 39.3 | 3.3 | 17.0(F) |
| 51 | $-SO_2CH_3$ | H | $-NHCH_3$ | 227–230 | 38.4 | 4.2 | 9.3(S) | 38.2 | 4.0 | 9.3(S) |
| 52 | $-SO_2CH_3$ | H | $-N(CH_3)_2$ | 150–170 | 40.2 | 4.1 | 8.7(S) | 40.0 | 4.4 | 8.9(S) |
| 53 | $-SO_2CH_3$ | $CH_3$ | $-NHCH_3$ | 183–185 | 40.2 | 4.3 | 9.3(S) | 40.0 | 4.5 | 8.9(S) |

*Slow decomposition.

Examples 54–109.—Herbicidal activity

A representative range of plants, i.e., maze (Mz), oat (O), ryegrass (RG), pea (P), linseed (L), mustard (M) and sugar beet (SB), were used to evaluate the herbicidal activity of the ortho-nitroanilinoacetamides of the invention.

Two categories of tests, pre-emergence and post-emergence, were performed. The pre-emergence test involved spraying a liquid formulation of the test compound onto the soil in which seeds of the plant species had recently been sown.

Two types of post-emergence tests, soil drench and foliar spray, were performed. The soil drench consists of drenching the soil with a liquid formulation of the test compound after the seeds of the aforementioned plants had germinated while in the foliar spray tests seedlings were sprayed with such a formulation.

The formulation used consisted of 40 parts by volume of acetone, 60 parts by volume of water, 0.5 part by weight of an alkylphenol/ethylene oxide condensate (surface active agent) and varying amounts of the test compounds. All test compounds were applied in two dosages equivalent to 1 and 10 kg./ha. (kilogram/hectare), respectively, in the soil spray and foliar spray test, and in a dosage equivalent to 20 kg./ha. in the soil drench test.

The herbicidal effects of the compounds were assessed visually seven days after spraying the foliage and drenching the soil (post-emergence tests) and eleven days after spraying the soil (pre-emergence tests), and were recorded on an 0–9 scale (0=no effect and 9=very strong herbicidal effect). A rating of 2 approximately corresponds to a reduction in fresh weight of stem and leaf of the treated plants of 25%, a rating of 5 approximately corresponds to a reduction in weights of 55% and a rating of 9 to a reduction in weight of 95%.

The results are summarized in the following table. The dashes (—) indicate that no test was conducted at that concentration.

| Example | Compound | | Dosage, kg./ha. | Pre-emergence (seeds) Soil spray Mz | O | RG | P | L | M | SB | Post-emergence Foliar spray Mz | O | RG | P | L | M | SB | Post-emergence Soil drench Mz | O | RG | P | L | M | SB |
|---|---|---|---|---|---|---|---|---|---|---|---|---|---|---|---|---|---|---|---|---|---|---|---|---|
| | 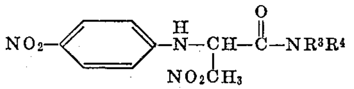 | | | | | | | | | | | | | | | | | | | | | | | |
| | $R_3$ | $R_4$ | | | | | | | | | | | | | | | | | | | | | | |
| 54 | H | $CH_3$ | 10 | 0 | 2 | 1 | 0 | 0 | 3 | 2 | 0 | 0 | 0 | 3 | 3 | 7 | 2 | 0 | 1 | 1 | 0 | 0 | 0 | 0 |
| | | | 1 | — | — | — | — | — | — | — | — | — | — | 1 | 1 | 4 | 2 | | | | | | | |
| 55 | $CH_3$ | $CH_3$ | 10 | 0 | 1 | 0 | 0 | 0 | 5 | 4 | 1 | 1 | 1 | 2 | 5 | 5 | 2 | 0 | 0 | 0 | 0 | 3 | 1 | 0 |
| | | | 1 | — | 0 | — | — | — | 0 | 0 | 1 | 0 | 0 | 1 | 4 | 4 | 1 | | | | | | | |
| | 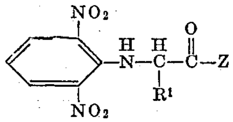 | | | | | | | | | | | | | | | | | | | | | | | |
| | $R_1$ | Z | | | | | | | | | | | | | | | | | | | | | | |
| 56 | $CH_3$ | $-NH_2$ | 10 | 1 | 1 | 1 | 0 | 3 | 6 | 6 | 0 | 0 | 0 | 1 | 2 | 6 | 1 | 0 | 4 | 2 | 1 | 6 | 7 | 1 |
| | | | 1 | 0 | 0 | 0 | — | 0 | 0 | 0 | — | — | — | 0 | 1 | 2 | 1 | | | | | | | |
| 57 | $-CH_3$ | $-NHCH_3$(d-l) | 10 | 8 | 9 | 9 | 6 | 9 | 9 | 9 | 5 | 9 | 7 | 5 | 8 | 9 | 9 | 6 | 8 | 8 | 3 | 9 | 8 | 6 |
| | | | 1 | 4 | 8 | 5 | 2 | 5 | 4 | 4 | 2 | 5 | 3 | 3 | 6 | 9 | 8 | | | | | | | |
| 58 | $CH_3$ | $-NHCH_3$(l) | 10 | 2 | 2 | 0 | 1 | 5 | 8 | 4 | 3 | 3 | 2 | 5 | 7 | 8 | 8 | 3 | 6 | 7 | 3 | 7 | 8 | 8 |
| | | | 1 | 0 | 0 | — | 0 | 0 | 0 | 0 | 2 | 1 | 0 | 2 | 3 | 8 | 3 | | | | | | | |
| 59 | $CH_3$ | $-NHCH_3$(d) | 10 | 8 | 9 | 8 | 5 | 9 | 9 | 9 | 5 | 8 | 7 | 6 | 9 | 8 | 9 | 4 | 7 | 7 | 1 | 9 | 8 | 7 |
| | | | 1 | 5 | 8 | 6 | 1 | 5 | 4 | 6 | 3 | 2 | 1 | 3 | 7 | 8 | 7 | | | | | | | |
| 60 | $CH_3$ | $-N(CH_3)_2$ | 10 | 5 | 6 | 7 | 1 | 5 | 8 | 7 | 6 | 8 | 7 | 6 | 9 | 9 | 9 | 5 | 7 | 9 | 5 | 9 | 9 | 9 |
| | | | 1 | 0 | 1 | 0 | 0 | 0 | 0 | 2 | 2 | 1 | 1 | 2 | 4 | 8 | 5 | | | | | | | |
| 61 | $CH_3$ | $-NH(C_2H_5)$ | 10 | 6 | 8 | 8 | 0 | 9 | 8 | 9 | 7 | 8 | 8 | 5 | 7 | 8 | 9 | 0 | 8 | 7 | 4 | 9 | 7 | 6 |
| | | | 1 | 1 | 7 | 1 | — | 3 | 1 | 1 | 4 | 6 | 3 | 2 | 5 | 7 | 6 | | | | | | | |
| 62 | $CH_3$ | $-N(C_2H_5)_2$ | 10 | 0 | 0 | 0 | 0 | 2 | 2 | 6 | 5 | 6 | 3 | 4 | 9 | 7 | 9 | 0 | 1 | 4 | 0 | 7 | 2 | 6 |
| | | | 1 | — | — | — | — | 0 | 0 | 0 | 3 | 3 | 1 | 1 | 5 | 7 | 6 | | | | | | | |
| 63 | $CH_3$ | $-NHCH(CH_3)CH_2CH_3$ | 10 | 1 | 0 | 0 | 0 | 3 | 1 | 3 | 2 | 1 | 1 | 4 | 6 | 7 | 8 | 1 | 1 | 1 | 1 | 4 | 4 | 4 |
| | | | 1 | 0 | — | — | — | 0 | 0 | 0 | 1 | 1 | 0 | 1 | 2 | 5 | 1 | | | | | | | |
| 64 | $CH_3$ | $-NCH_3$ 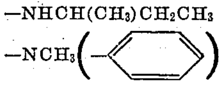 | 10 | 0 | 0 | 0 | 0 | 2 | 0 | — | 2 | 1 | 0 | 0 | 6 | 6 | 8 | 0 | 0 | 0 | 0 | 0 | 0 | 0 |
| | | | 1 | — | — | — | — | 0 | — | 0 | 1 | 0 | — | — | 5 | 3 | 6 | | | | | | | |
| 65 | $CH_3$ | $-NH$ 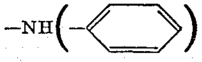 | 10 | 0 | 4 | 0 | 0 | 0 | 0 | 0 | 2 | 0 | 0 | 0 | 5 | 4 | 7 | 0 | 0 | 0 | 0 | 0 | 0 | 0 |
| | | | 1 | — | 4 | — | — | — | — | — | 0 | — | — | — | 4 | 2 | 5 | | | | | | | |
| 66 | $CH_3$ | $-NH(-CH_2-CH=CH_2)$ | 10 | 7 | 9 | 8 | 0 | 8 | 7 | 8 | 3 | 6 | 7 | 5 | 8 | 8 | 8 | 2 | 6 | 7 | 1 | 8 | 7 | 7 |
| | | | 1 | 0 | 5 | 2 | — | 0 | 0 | 2 | 1 | 2 | 1 | 0 | 5 | 6 | 7 | | | | | | | |
| 67 | $CH_3$ | $-NCH_3(CH_2OH)$ | 10 | 8 | 9 | 9 | 0 | 9 | 9 | 9 | 8 | 9 | 7 | 4 | 9 | 9 | 7 | 7 | 9 | 9 | 3 | 9 | 9 | 8 |
| | | | 1 | 0 | 8 | 6 | — | 5 | 3 | 8 | 1 | 5 | 2 | 4 | 8 | 7 | 6 | | | | | | | |
| 68 | $CH_3$ | 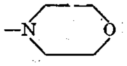 | 10 | 0 | 0 | 0 | 0 | 1 | 4 | 4 | 2 | 3 | 2 | 5 | 7 | 8 | 7 | 6 | 7 | 5 | 5 | 8 | 8 | |
| | | | 1 | — | — | — | — | 0 | 0 | 0 | 1 | 0 | 0 | 1 | 1 | 6 | 2 | | | | | | | |
| 69 | $CH_3$ | 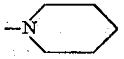 | 10 | 0 | 0 | 0 | 0 | 0 | 0 | 0 | 0 | 0 | 0 | 2 | 4 | 9 | 3 | 0 | 0 | 0 | 0 | 4 | 0 | 0 |
| | | | 1 | — | — | — | — | — | — | — | — | — | — | 0 | 1 | 6 | 0 | | | | | | | |
| 70 | $-CH(CH_3)_2$ | $-NHCH_3$ | 10 | 1 | 3 | 1 | 0 | 6 | 8 | 6 | 2 | 6 | 1 | 1 | 6 | 9 | 5 | 7 | 6 | 8 | 1 | 8 | 8 | 7 |
| | | | 1 | 0 | 0 | 0 | — | 1 | 2 | 0 | 2 | 0 | 0 | 0 | 3 | 8 | 2 | | | | | | | |
| 71 | $-CH_2CH(CH_3)_2$ | $-NHCH_3$ | 10 | 0 | 2 | 1 | 0 | 2 | 5 | 3 | 1 | 3 | 1 | 1 | 4 | 9 | 4 | 4 | 3 | 5 | 0 | 8 | 8 | 5 |
| | | | 1 | — | 0 | 0 | — | 0 | 0 | 0 | 0 | 0 | 0 | 0 | 2 | 8 | 1 | | | | | | | |

TABLE.—Continued

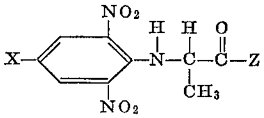

| Example | Compound X | Z | Dosage, kg./ha. | Pre-emergence (seeds) Soil spray Mz | O | RG | P | L | M | SB | Post-emergence Foliar spray Mz | O | RG | P | L | M | SB | Post-emergence Soil drench Mz | O | RG | P | L | M | SB |
|---|---|---|---|---|---|---|---|---|---|---|---|---|---|---|---|---|---|---|---|---|---|---|---|---|
| 72 | $—CH_3$ | $—NHCH_3$(l) | 10 | 0 | 1 | 0 | 0 | 3 | 1 | 4 | 1 | 1 | 1 | 4 | 7 | 8 | 7 | 6 | 8 | 8 | 5 | 7 | 9 | 7 |
| | | | 1 | | 0 | | | 0 | 0 | 0 | 1 | 0 | 0 | 1 | 4 | 6 | 2 | | | | | | | |
| 73 | $—CH_3$ | $—NHCH_3$(d) | 10 | 9 | 9 | 9 | 5 | 9 | 9 | 9 | 7 | 9 | 8 | 7 | 9 | 9 | 9 | 9 | 9 | 9 | 6 | 9 | 9 | 9 |
| | | | 1 | 8 | 9 | 9 | 0 | 9 | 9 | 9 | 7 | 8 | 7 | 7 | 8 | 9 | 9 | | | | | | | |
| 74 | $—CH_3$ | $—NHCH_3$(d-l) | 10 | 9 | 9 | 9 | 7 | 9 | 9 | 9 | 7 | 8 | 7 | 6 | 9 | 9 | 9 | 8 | 8 | 8 | 7 | 9 | 8 | 9 |
| | | | 1 | 8 | 8 | 8 | 4 | 9 | 9 | 9 | 7 | 7 | 3 | 5 | 9 | 9 | 8 | | | | | | | |
| 75 | $—C_2H_5$ | $—NHCH_3$(d-l) | 10 | 9 | 9 | 9 | 1 | 9 | 9 | 9 | 8 | 9 | 8 | 6 | 9 | 9 | 9 | 9 | 9 | 9 | 3 | 9 | 9 | 9 |
| | | | 1 | 8 | 8 | 9 | 1 | 9 | 9 | 9 | 6 | 8 | 6 | 5 | 7 | 7 | 7 | | | | | | | |
| 76 | $—C_2H_5$ | $—NHCH_3$(d) | 10 | 8 | 9 | 9 | 0 | 9 | 9 | 9 | 9 | 8 | 8 | 6 | 9 | 9 | 9 | 9 | 8 | 9 | 8 | 9 | 9 | 9 |
| | | | 1 | 6 | 9 | 9 | | 9 | 9 | 9 | 8 | 6 | 8 | 2 | 9 | 9 | 9 | | | | | | | |
| 77 | $—C_2H_5$ | $—NHCH_3$(l) | 10 | 0 | 0 | 0 | 0 | 1 | 2 | 2 | 4 | 0 | 0 | 4 | 7 | 7 | 0 | 6 | 5 | 8 | 0 | 9 | 4 | 2 |
| | | | 1 | | | | | 0 | 0 | 0 | 3 | | | 1 | 4 | 6 | | | | | | | | |
| 78 | $—(CH_2)_2CH_3$ | $—NHCH_3$ | 10 | 1 | 3 | 3 | 0 | 0 | 0 | 2 | 3 | 2 | 3 | 4 | 5 | 8 | 5 | 3 | 7 | 6 | 0 | 3 | 2 | 0 |
| | | | 1 | 0 | 0 | 0 | | | | 0 | 2 | 1 | 1 | 2 | 2 | 5 | 2 | | | | | | | |
| 79 | $—CH(CH_3)_2$ | $—NHCH_3$(d-l) | 10 | 0 | 0 | 0 | 0 | 0 | 0 | 0 | 2 | 2 | 1 | 3 | 5 | 5 | 5 | 0 | 3 | 4 | 0 | 0 | 0 | 0 |
| | | | 1 | | | | | | | | 1 | 0 | 0 | 0 | 1 | 3 | 0 | | | | | | | |
| 80 | $—CH(CH_3)(CH_2CH_3)$ | $—NHCH_3$ | 10 | 0 | 0 | 0 | 0 | 3 | 1 | 0 | 5 | 5 | 1 | 2 | 5 | 9 | 0 | 1 | 0 | 1 | 0 | 1 | 5 | 0 |
| | | | 1 | | | | | 0 | 0 | | 2 | 1 | 0 | 0 | 1 | 1 | 0 | | | | | | | |
| 81 | 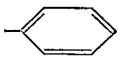 | $—NHCH_3$ | 10 | 0 | 0 | 0 | 0 | 0 | 0 | 0 | 0 | 0 | 0 | 0 | 3 | 3 | 0 | 0 | 0 | 0 | 0 | 0 | 0 | 0 |
| | | | 1 | | | | | | | | | | | | 0 | 0 | | | | | | | | |
| 82 | $—CF_3$ | $—NH_2$ | 10 | 0 | 0 | 0 | 0 | 0 | 0 | 0 | 0 | 0 | 0 | 2 | 5 | 7 | 0 | 0 | 0 | 0 | 0 | 0 | 2 | 0 |
| | | | 1 | | | | | | | | | | | 0 | 0 | 6 | | | | | | | | |
| 83 | $—CF_3$ | $—N(CH_3)_2$ | 10 | 0 | 0 | 0 | 0 | 3 | 1 | 2 | 2 | 0 | 1 | 3 | 4 | 7 | 5 | 2 | 1 | 3 | 1 | 6 | 5 | 3 |
| | | | 1 | | | | | 1 | 0 | 0 | 1 | | 0 | 0 | 1 | 1 | 0 | | | | | | | |
| 84 | $—CH_3$ | $—NHCH_3$(d-l) | 10 | 6 | 7 | 9 | 1 | 8 | 9 | 8 | 3 | 1 | 4 | 3 | 6 | 6 | 1 | 6 | 5 | 6 | 1 | 9 | 5 | 5 |
| | | | 1 | 3 | 5 | 6 | 0 | 0 | 0 | | 2 | 0 | 1 | 2 | 4 | 5 | 0 | | | | | | | |
| 85 | $—CF_3$ | $—NHCH_3$(d) | 10 | 8 | 8 | 8 | 0 | 8 | 7 | 9 | 3 | 3 | 2 | 3 | 9 | 7 | 0 | | | | | | | |
| | | | 1 | 1 | 6 | 6 | | 3 | 3 | 2 | 2 | 1 | 0 | 1 | 4 | 6 | | | | | | | | |
| 86 | $—CF_3$ | $—NHCH_3$(l) | 10 | 0 | 0 | 0 | 0 | 0 | 0 | 0 | 0 | 0 | 0 | 1 | 3 | 3 | 0 | 1 | 1 | 0 | 0 | 5 | 3 | 0 |
| | | | 1 | | | | | | | | | | | 0 | 0 | 1 | | | | | | | | |
| 87 | $—SO_2CH_3$ | $—NHCH_3$ | 10 | 0 | 0 | 0 | 0 | 0 | 0 | 0 | 0 | 0 | 0 | 1 | 2 | 4 | 0 | 0 | 0 | 0 | 0 | 0 | 0 | 0 |
| | | | 1 | | | | | | | | | | | 0 | 0 | 1 | | | | | | | | |
| 88 | $—SO_2CH_3$ | $—N(CH_3)_2$ | 10 | 0 | 0 | 0 | 0 | 0 | 0 | 0 | 1 | 0 | 0 | 1 | 3 | 7 | 1 | 0 | 0 | 0 | 0 | 3 | 3 | 0 |
| | | | 1 | | | | | | | | 0 | | | 0 | 0 | 2 | 0 | | | | | | | |
| 89 | Cl | $—NHCH_3$(d-l) | 10 | 6 | 8 | 9 | 1 | 9 | 4 | 8 | 7 | 5 | 6 | 4 | 9 | 7 | 3 | 7 | 7 | 8 | 7 | 9 | 9 | 4 |
| | | | 1 | 0 | 6 | 7 | 0 | 4 | 0 | 3 | 7 | 2 | 3 | 4 | 8 | 8 | 2 | | | | | | | |
| 90 | Cl | $—NHCH_3$(d) | 10 | 9 | 9 | 9 | 4 | 9 | 9 | 9 | 6 | 7 | 6 | 6 | 9 | 9 | 7 | 9 | 9 | 9 | 6 | 9 | 9 | 6 |
| | | | 1 | 8 | 8 | 6 | 1 | 8 | 8 | 8 | 4 | 5 | 4 | 4 | 7 | 8 | 5 | | | | | | | |
| 91 | Cl | $—NHCH_3$(l) | 10 | 0 | 0 | 0 | 0 | 0 | 0 | 0 | 1 | 0 | 1 | 3 | 6 | 8 | 1 | 6 | 0 | 0 | 1 | 8 | 6 | 0 |
| | | | 1 | | | | | | | | 1 | 0 | 0 | 0 | 1 | 7 | 0 | | | | | | | |
| 92 | $—CN$ | $—NHCH_3$ | 10 | 0 | 5 | 4 | 0 | 0 | 0 | 0 | 5 | 1 | 1 | 1 | 3 | 7 | 1 | 0 | 0 | 0 | 0 | 0 | 0 | 0 |
| | | | 1 | | 0 | 0 | | | | | 1 | 0 | 0 | 0 | 1 | 4 | 0 | | | | | | | |
| 93 | 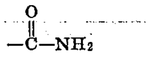 | $—NHCH_3$ | 10 | 0 | 0 | 0 | 0 | 0 | 0 | 0 | 0 | 0 | 0 | 1 | 3 | 4 | 0 | 0 | 0 | 0 | 0 | 0 | 0 | 0 |
| | | | 1 | | | | | | | | | | | 0 | 2 | 3 | | | | | | | | |
| 94 | 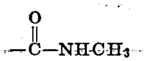 | $—NHCH_3$ | 10 | 0 | 0 | 0 | 0 | 0 | 0 | 0 | 0 | 0 | 0 | 0 | 0 | 1 | 0 | 0 | 0 | 0 | 0 | 0 | 0 | 0 |
| | | | 1 | | | | | | | | | | | | | 0 | | | | | | | | |
| | | | | | | | | | | | | | | | | 0 | | | | | | | | |
| 95 | $—NO_2$ | $—NHCH_3$ | 10 | 0 | 0 | 0 | 0 | 0 | 0 | 0 | 1 | 0 | 1 | 2 | 5 | 6 | 2 | 0 | 0 | 0 | 0 | 0 | 0 | 0 |
| | | | 1 | | | | | | | | 0 | | 0 | 0 | 1 | 1 | 0 | | | | | | | |

TABLE.—Continued

| Example | X | R | Z | Dosage, kg./ha. | Pre-emergence (seeds) Soil spray Mz | O | RG | P | L | M | SB | Post-emergence Foliar spray Mz | O | RG | P | L | M | SB | Post-emergence Soil drench Mz | O | RG | P | L | M | SB |
|---|---|---|---|---|---|---|---|---|---|---|---|---|---|---|---|---|---|---|---|---|---|---|---|---|---|
| 96 | H | H | —NHCH$_3$ | 10 | 0 | 0 | 1 | 0 | 3 | 4 | 6 | 4 | 6 | 6 | 5 | 6 | 8 | 8 | 0 | 6 | 7 | 0 | 7 | 5 | 5 |
| | | | | 1 | - | - | 0 | - | 0 | 0 | 0 | 4 | 4 | 2 | 3 | 5 | 8 | 7 | | | | | | | |
| 97 | H | H | —N(CH$_3$)$_2$ | 10 | 0 | 1 | 0 | 0 | 2 | 5 | 3 | 2 | 2 | 2 | 3 | 6 | 9 | 8 | 0 | 2 | 6 | 0 | 8 | 9 | 5 |
| | | | | 1 | - | 0 | - | - | 0 | 0 | 0 | 2 | 1 | 1 | 2 | 2 | 7 | 3 | | | | | | | |
| 98 | H | CH$_3$ | —NHCH$_3$ | 10 | 0 | 0 | 0 | 0 | 2 | 2 | 3 | 1 | 2 | 1 | 3 | 5 | 6 | 3 | 0 | 1 | 0 | 1 | 2 | 2 | 1 |
| | | | | 1 | - | - | - | - | 0 | 0 | 0 | 1 | 1 | 0 | 1 | 2 | 2 | 1 | | | | | | | |
| 99 | CH$_3$ | H | —NHCH$_3$ | 10 | 1 | 0 | 0 | 0 | 4 | 2 | 7 | 6 | 2 | 4 | 4 | 8 | 9 | 9 | 5 | 5 | 9 | 1 | 9 | 6 | 5 |
| | | | | 1 | 0 | - | - | - | 1 | 1 | 0 | 3 | 0 | 0 | 1 | 4 | 8 | 2 | | | | | | | |
| 100 | —CF$_3$ | H | —N(CH$_3$)$_2$ | 10 | 0 | 0 | 0 | 0 | 0 | 0 | 0 | 2 | 0 | 0 | 2 | 4 | 8 | 0 | 0 | 0 | 0 | 0 | 0 | 0 | 0 |
| | | | | 1 | - | - | - | - | - | - | - | 2 | - | - | 1 | 1 | 6 | - | | | | | | | |
| 101 | —CF$_3$ | CH$_3$ | —NHCH$_3$ | 10 | 0 | 0 | 0 | 0 | 0 | 2 | 1 | 0 | 0 | 0 | 0 | 5 | 7 | 2 | 1 | 1 | 1 | 0 | 1 | 2 | 0 |
| | | | | 1 | - | - | - | - | - | 0 | 0 | - | - | - | - | 1 | 3 | 0 | | | | | | | |
| 102 | —CF$_3$ | H | —NHCH$_3$ | 10 | 0 | 0 | 0 | 0 | 0 | 3 | 1 | 3 | 2 | 1 | 4 | 8 | 8 | 0 | 2 | 0 | 2 | 0 | 8 | 7 | 3 |
| | | | | 1 | - | - | - | - | - | 0 | 0 | 2 | 0 | 0 | 0 | 4 | 8 | - | | | | | | | |
| 103 | —SO$_2$CH$_3$ | H | —NHCH$_3$ | 10 | 0 | 0 | 0 | 0 | 0 | 0 | 0 | 0 | 0 | 0 | 0 | 1 | 2 | 0 | 0 | 0 | 0 | 0 | 1 | 0 | 0 |
| | | | | 1 | - | - | - | - | - | - | - | - | - | - | - | 0 | 0 | - | | | | | | | |
| 104 | —SO$_2$CH$_3$ | H | —N(CH$_3$)$_2$ | 10 | 0 | 0 | 0 | 0 | 0 | 0 | 0 | 2 | 0 | 0 | 1 | 3 | 6 | 0 | 0 | 0 | 0 | 0 | 0 | 1 | 0 |
| | | | | 1 | - | - | - | - | - | - | - | 1 | - | - | 1 | 1 | 5 | - | | | | | | | |
| 105 | —SO$_2$CH$_3$ | CH$_3$ | —NHCH$_3$ | 10 | 0 | 0 | 0 | 0 | 0 | 0 | 0 | 2 | 0 | 0 | 0 | 3 | 4 | 0 | 0 | 0 | 0 | 0 | 0 | 0 | 0 |
| | | | | 1 | - | - | - | - | - | - | - | 2 | - | - | - | 1 | 1 | - | | | | | | | |
| 107 | —CH$_3$ | | —NHOH | 10 | 0 | 4 | 8 | 0 | 9 | 9 | 7 | 2 | 6 | 8 | 6 | 9 | 9 | 9 | 1 | 2 | 7 | 6 | 9 | 8 | 7 |
| | | | | 1 | - | 2 | 0 | - | 2 | 2 | 0 | 1 | 1 | 2 | 0 | 9 | 9 | 9 | | | | | | | |
| 108 | —CH$_3$ | | —N(CH$_3$)OH | 10 | 3 | 9 | 9 | 0 | 9 | 9 | 9 | 8 | 9 | 7 | 0 | 9 | 7 | 8 | 7 | 7 | 8 | 0 | 9 | 6 | 7 |
| | | | | 1 | 0 | 9 | 8 | - | 9 | 6 | 7 | 6 | 8 | 4 | - | 9 | 7 | 4 | | | | | | | |
| 109 | —CH$_3$ | | —NHOCH$_3$ | 10 | 0 | 9 | 9 | 0 | 9 | 9 | 9 | 3 | 6 | 3 | 0 | 7 | 4 | 6 | 1 | 6 | 6 | 0 | 9 | 5 | 2 |
| | | | | 1 | - | 9 | 9 | - | 7 | 7 | 9 | 2 | 3 | 1 | - | 7 | 3 | 3 | | | | | | | |

Compound:

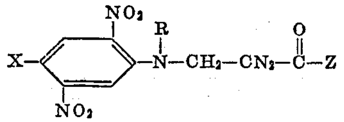

When Z is —$NR^3R^4$ wherein $R^3$ is monohydroxyalkyl of 1–4 carbon atoms, the compounds may alternatively be prepared by replacing the carbamoyl hydrogen of an ortho-nitroanalino-alkylacetamide with a 1–4 carbon atom hydroxyalkyl group derived from the corresponding aldehyde. The appropriate ortho-nitroanilino-N-alkylacetamide may be suspended or dissolved in an organic solvent and reacted with the aldehyde in the presence of dry hydrogen chloride gas. The ortho-nitroanilino-N-hydroxyalkylacetamide may then be recovered by conventional techniques such as filtration, solvent evaporation and the like. Thus:

Example 106.—Preparation of 2-(2,6-ninitroanilino)-N-hydroxymethyl-N-methylpropionamide Dry hydrogen chloride gas was passed for six hours into a stirred mixture of 2-(2,6-dinitroanilino)-N-methylpropionamide (27 w.), prepared as in Example I, paraformaldehyde (4.5 w.) and methylene chloride (200 v.). The mixture was maintained at room temperature during this time and on completion of the reaction the precipitated solid was filtered off and washed with sodium bicarbonate solution.

The free base obtained in this manner was dissolved in methylene chloride and the solution dried over $MgSO_4$. The solvent was removed under reduced pressure and the residue crystallised from ethanol to give 2-(2,6-dinitroanilino)-N-hydroxymethyl-N - methylpropionamide, M.P. 135–136° C.

*Analysis.*—Found (percent): C, 44.7; H, 4.5. Calculated for $C_{11}H_{14}(N_4O_6$ percent): C, 44.3; H, 4.7.

Example 107.—2 - (2,6-dinitro-4-methylanilino)-propionohydroxamic acid

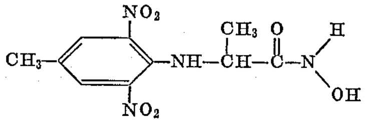

2-(2,6-dinitro-4-methylanilino)-propionyl chloride (5.0 g.) in benzene (20 ml.) was added dropwise to a stirred, ice cold, aqueous solution of hydroxylamine hydrochloride (5.0 g.) and sodium acetate (7.0 g.). The solution was stirred for 2 hours and then extracted with methylene chloride. The extracts were washed with water, dried with anhydrous magnesium sulfate and evaporated to give the crude product which was recrystallized from ethanol to give the desired product having a M.P. 161–162° C.

*Analysis.*—Calculated for $C_{10}H_{12}N_4O_6$ (percent): C, 42.3; H, 4.3; N, 19.7. Found (percent): C, 42.4; H, 4.1; N, 20.2.

Example 108.—2-(2,6-dinitro-4-methylanilino)-N-methyl propionohydroxamic acid

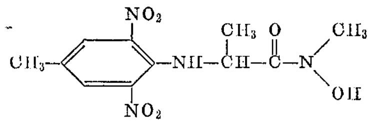

2-(2,6-dinitro-4-methylanilino)-propionyl chloride (2.0 g.) in methylene chloride (50 ml.) was added dropwise to a stirred solution of N-methyl hydroxylamine hydrochloride (2.0 g.) and sodium acetate (6.0 g.) in water (50 ml.) at 0–5° C. The mixture was stirred for 2 hours, after which the organic layer was separated, dried and evaporated to dryness. The yellow residue was recrystallized from benzene to give the desired product having M.P. 171–172° C.

*Analysis.*—Calculated for $C_{11}H_{14}N_4O_6$ (percent): C, 44.3; H, 4.7; N, 18.8. Found (percent): C, 44.6; H, 4.6; N, 18.9.

Example 109.—2-(2,6-dinitro-4-methylanilino))-propionohydroxamic acid, methyl ester

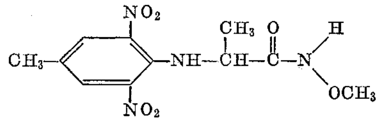

2-(2,6-dinitro-4-methylanilino)propionyl chloride (3.2 g.) in methylene chloride (50 ml.) was added dropwise to a solution of methoxylamine hydrochloride (4 g.) and sodium acetate (8.0 g.) in water (50 ml.) at 15–20° C. The mixture was stirred for 1 hour. The organic layer was then separated, dried and evaporated to dryness. The yellow residue was recrystallized from ethanol to give the desired product having a M.P. of 155–156° C.

*Analysis.*—Calculated for $C_{11}H_{14}N_4O_6$ (percent): C, 44.4; H, 4.7; N, 18.8. Found (percent): C, 44.8; H, 4.9; N, 18.7.

We claim as our invention:

1. An ortho-nitroanilinoacetamide having the formula

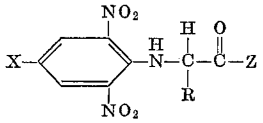

wherein X is hydrogen, alkyl of 1–4 carbon atoms, chlorine, bromine, fluoromethyl, chloromethyl, or bromomethyl; R is alkyl of 1–4 carbon atoms; Z is morpholino or —$NR^1R^2$ in which $R^1$ is hydrogen, alkyl or 1–4 carbon atoms, allyl, hydroxymethyl, hydroxy or methoxy and $R^2$ is hydrogen or alkyl of 1–4 carbon atoms.

2. An ortho-nitroanilinoacetamide having the formula

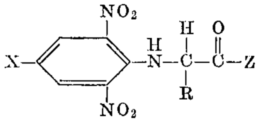

in which Z is —$NHCH_3$, R is methyl and X is alkyl of 1–4 carbon atoms, trifluoromethyl, chlorine, bromine or hydrogen.

3. An ortho-nitroanilinoacetamide of claim 2 wherein X is methyl or ethyl.

4. 2-(2,6-dinitroanilino)-N-methylpropionamide.

5. 2 - (2,6 - dinitroanilino)-N-methyl-N-hydroxymethylpropionamide.

6. 2 - (2,6 - dinitro - 4-methylanilino)-N-methylpropionamide.

7. 2-(2,6-dinitro-4-trifluoromethylanilino)-N-methylpropionamide.

8. 2 - (2,6 - dinitro - 4-chloroanilino)-N-methylpropionamide.

References Cited

UNITED STATES PATENTS 3,417,139 12/1968 Towle .............. 260—558

HENRY R. JILES, Primary Examiner

H. I. MOATZ, Assistant Examiner

U.S. Cl. X.R.

71—88, 94, 103, 105, 118; 260—247.1, 247.5 R, 293.4 G, 294.7 E, 453 R, 465 D, 500.5 H, 534 R, 558 D, 558 S, 607 A, 646